US012789355B2

(12) United States Patent
Rogge et al.

(10) Patent No.: US 12,789,355 B2
(45) Date of Patent: Nov. 10, 2026

(54) CREEPER WITH RAISED POSITION AND LOWERED POSITION AND WITH HIDDEN HINGE ASSEMBLY

(71) Applicant: WHITESIDE MFG. CO., Delaware, OH (US)

(72) Inventors: Jason Reed Rogge, Belle Vernon, PA (US); Kirt E. Whiteside, Delaware, OH (US)

(73) Assignee: WHITESIDE MFG. CO., Delaware, OH (US)

( * ) Notice: Subject to any disclaimer, the term of this patent is extended or adjusted under 35 U.S.C. 154(b) by 327 days.

(21) Appl. No.: 18/462,759

(22) Filed: Sep. 7, 2023

(65) Prior Publication Data

US 2025/0083299 A1 Mar. 13, 2025

(51) Int. Cl.
*B25H 5/00* (2006.01)
*B60B 33/00* (2006.01)

(52) U.S. Cl.
CPC ........... *B25H 5/00* (2013.01); *B60B 33/0007* (2013.01); *B60B 33/001* (2013.01); *B60B 33/0026* (2013.01)

(58) Field of Classification Search
CPC ... B62H 5/00; B60B 33/0007; B60B 33/0026; B60B 33/001
See application file for complete search history.

(56) References Cited

U.S. PATENT DOCUMENTS

| | | | | | |
|---|---|---|---|---|---|
| 2,668,964 | A * | 2/1954 | Simmons | B62H 5/00 | 5/636 |
| 2,780,472 | A * | 2/1957 | Weldon, Sr. | B25H 5/00 | 280/32.6 |
| 5,108,118 | A * | 4/1992 | Schaevitz | B25H 5/00 | 280/32.6 |
| 5,330,211 | A * | 7/1994 | Nicholson | B25H 5/00 | 280/32.6 |
| 5,527,051 | A * | 6/1996 | Plaza | B25H 5/00 | 280/32.6 |
| 6,932,314 | B2 * | 8/2005 | Patterson | B60B 33/0021 | 248/346.11 |
| 7,032,909 | B2 * | 4/2006 | Lensing | B25H 5/00 | 280/32.6 |
| 7,213,815 | B2 * | 5/2007 | Whiteside | B60B 33/0057 | 301/5.303 |
| 7,350,269 | B2 * | 4/2008 | Dominic | B60B 33/0002 | 16/30 |

(Continued)

*Primary Examiner* — James M Dolak
(74) *Attorney, Agent, or Firm* — Renner, Kenner, Greive, Bobak, Taylor & Weber Co. LPA

(57) ABSTRACT

A creeper includes a frame including side rails at a first height; legs with a flat portion at a different height than the first height; each of the legs including a through hole; each of the through holes being capable of receiving a respective stem of a respective caster assembly within either end thereof; such that the frame can receive the stems in a first position of the frame, and the frame can receive the stems in a flipped position of the frame, thereby providing the raised position and the lowered position for the pads. A hinge assembly is hidden from normal view, where the hinge assembly is positioned entirely below a headrest pad and a body pad. A method includes adjusting the creeper between the raised position and the lowered position for the pads.

15 Claims, 15 Drawing Sheets

(56) References Cited

U.S. PATENT DOCUMENTS

| | | | | |
|---|---|---|---|---|
| 7,434,817 | B2 * | 10/2008 | Rush | B25H 5/00 280/32.6 |
| 9,193,064 | B2 * | 11/2015 | Dall'Armi | B25H 5/00 |
| 9,272,411 | B1 * | 3/2016 | Whiteside | B25H 5/00 |
| 10,232,504 | B1 | 3/2019 | Whiteside et al. | |
| 10,328,570 | B1 * | 6/2019 | O'Donnell | B25H 5/00 |
| 12,358,124 | B2 * | 7/2025 | Spainhower | B25H 5/00 |
| 12,447,773 | B1 * | 10/2025 | Wang | B60B 33/0021 |
| 2007/0277350 | A1 * | 12/2007 | Hines | B60B 33/04 16/35 R |
| 2011/0227302 | A1 * | 9/2011 | Gillespie | B25H 5/00 280/32.6 |

* cited by examiner

CREEPER WITH RAISED POSITION AND LOWERED POSITION AND WITH HIDDEN HINGE ASSEMBLY

FIELD OF THE INVENTION

The invention relates to a creeper, such as often used by a mechanic when servicing vehicles. Embodiments of the invention relate to a creeper providing a raised position and a lowered position. Embodiments of the invention relate to a creeper having a hidden hinge assembly which hidden hinge assembly provides for a headrest with an adjustable angular orientation relative to a body pad.

BACKGROUND

A typical creeper, as used by mechanics or the like, includes a body pad carried by a frame. The frame is supported by a plurality of wheels which render the creeper mobile. Different creepers can have different heights. There remains a need in the art for an improved creeper which includes the ability to adjust a height of a body pad.

U.S. Pat. No. 10,232,504 discloses a Creeper with Adjustable Headrest. The figures of the '504 patent show a hinge assembly having arms which are positioned on the outside edges of the pads. In the figures of the '504 patent, the arms are therefore not hidden from view. There remains a need in the art for an improved creeper which includes a hinge assembly which is generally hidden from view.

SUMMARY

It is thus an object of one aspect of the present invention to provide a creeper with a reversible frame in order to provide a raised position for a body pad and a lowered position for the body pad.

It is an object of another aspect of the invention to provide a reversible frame which allows a stem of a caster assembly to be inserted from either direction of the reversible frame.

These and other objects of the present invention, as well as the advantages therefore over existing, prior art forms, which will become apparent from the description to follow, are accomplished by the improvements hereinafter described and clarified.

In accordance with one aspect of the present invention, a creeper includes a frame including side rails at a first height; legs with a flat portion at a different height than the first height; each of the legs including a through hole; each of the through holes being capable of receiving a respective stem of a respective caster assembly within either end thereof; such that the frame can receive the stems in a first position of the frame, and the frame can receive the stems in a flipped position of the frame, thereby providing the raised position and the lowered position for the pads.

In accordance with another aspect of the present invention, a method includes flipping a creeper from an in-use position to an upside-down position, where the in-use position includes a frame of the creeper being in a first position and the upside-down position includes the frame being in a second position; removing a headrest pad, a body pad, and caster assemblies from any attachment with the frame; flipping over the frame from the second position to the first position; reinstalling the headrest pad, the body pad, and the caster assemblies to the creeper with the frame in the first position, such that flipping the frame back to the second position becomes a new in-use position of the creeper.

In accordance with a further aspect of the present invention, an assembly for providing a hinge assembly which is hidden from normal view includes a headrest pad, a body pad, and a hinge assembly for adjusting the headrest pad between angular orientations relative to the body pad, where the hinge assembly is positioned entirely below the headrest pad and the body pad.

BRIEF DESCRIPTION OF THE DRAWINGS

Reference is made to the accompanying drawings wherein.

DETAILED DESCRIPTION

Figure 1:
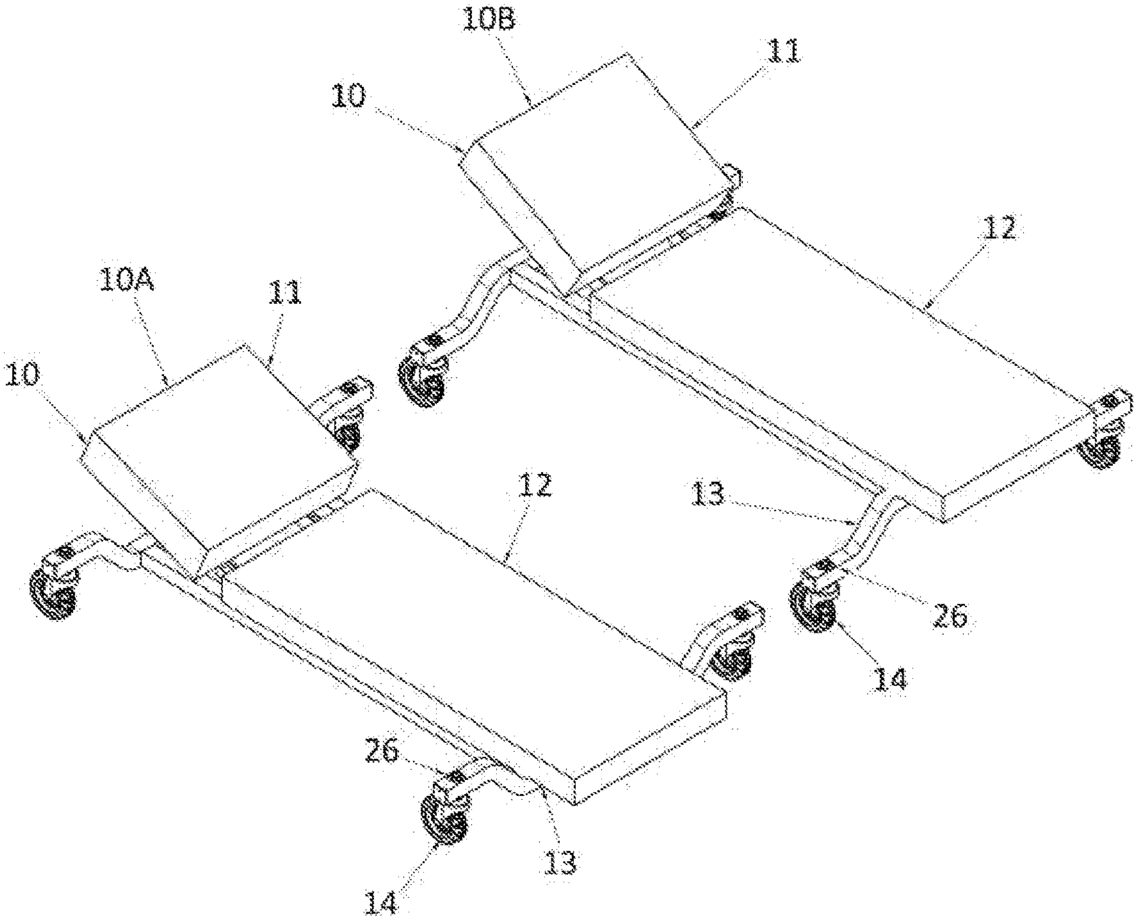
FIG. 1 is a perspective view of a creeper made in accordance with the present invention showing the creeper with pads in a lowered position and showing the creeper with the pads in a raised position.

One or more embodiments of the present invention relate to a creeper, such as often used by a mechanic when servicing vehicles. Embodiments of the invention relate to a creeper providing a raised position and a lowered position, which may be referred to as having a raised position for pads and a lowered position for the pads. This may also be referred to as the creeper having a first position with a lower ground clearance and a second position with a higher ground clearance. Advantageously, transitioning between the raised position for the pads and the lowered position for the pads can be achieved based simply on how the creeper is assembled. The ability to transition between the raised position for the pads and the lowered position for the pads is accomplished by inclusion of improved caster mounts within a frame of the creeper. The caster mounts allow stems of caster assemblies to be inserted from both ends. That is, the caster mounts are mounted within the frame, and in the raised position for the pads, respective stems of the caster assemblies will be inserted in a first end of respective caster mounts. When transitioning to the lowered position for the pads, the pads can be detached from the frame, the frame can be flipped over, the respective stems of the caster assemblies can be inserted in a second end of respective caster mounts, and the pads can be reattached with the frame. As a further advantage, embodiments of the invention relate to the creeper having a hinge assembly which is generally hidden from normal view, which hidden hinge assembly provides for a headrest pad with an adjustable angular orientation relative to a body pad of the pad.

With reference to the Figures, a creeper made in accordance with embodiments of the present invention is generally indicated by the numeral 10 and includes a headrest pad 11, a body pad 12, a frame generally indicated by the numeral 13, and a plurality of caster assemblies generally indicated by the numeral 14, which caster assemblies 14 render creeper 10 mobile.

Figure 10:
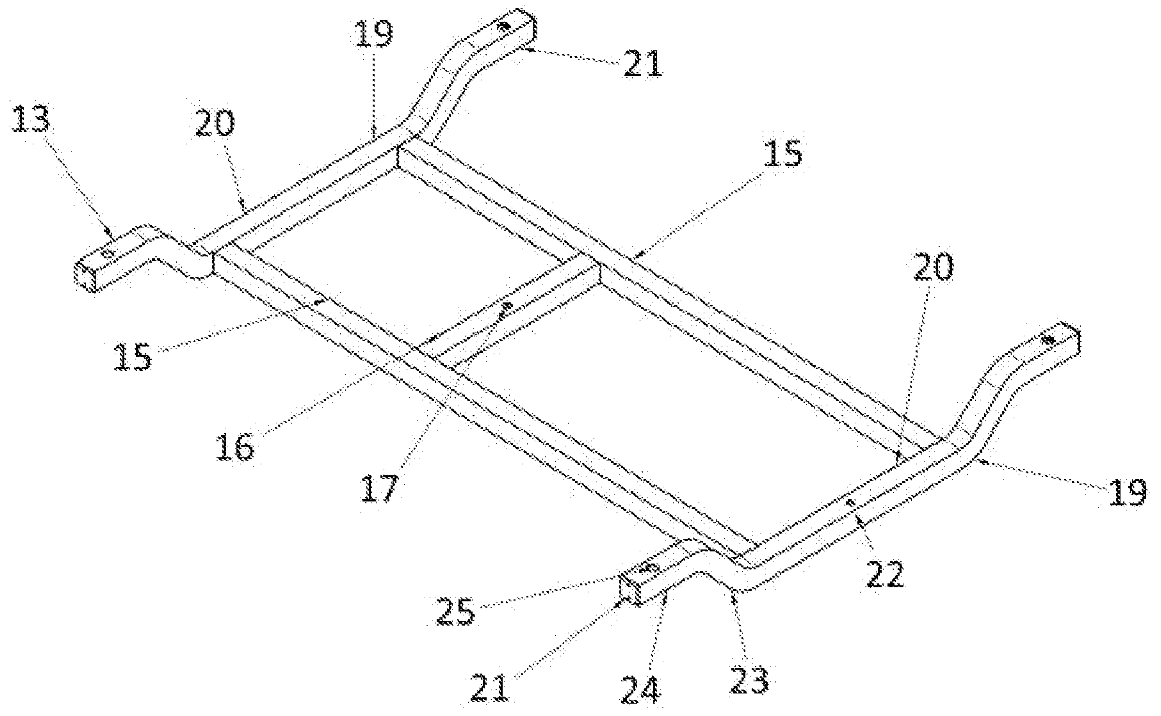
FIG. 10 is a perspective view of a frame of the creeper of FIG. 1.

Frame 13 (FIG. 10) includes opposed longitudinally extending side rails 15 which support body pad 12. A middle crossrail 16 extends between side rails 15 for further support of body pad 12. Middle crossrail 16 includes a through hole 17 positioned generally centrally therein for receiving a thumb bolt 18 (FIG. 8), which may be referred to as knob screw 18, for securing body pad 12 with frame 13.

Figure 7:
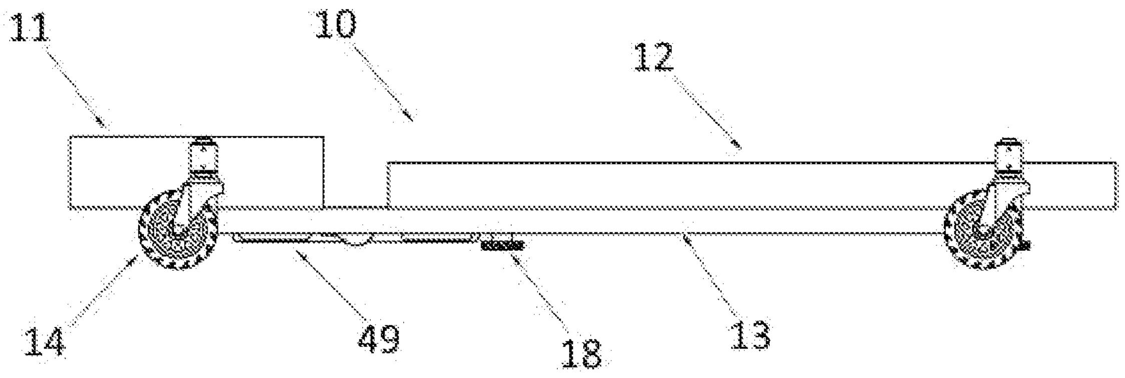
FIG. 7 is a side elevational view of the creeper with the pads in the lowered position of FIG. 1, showing the headrest pad in the first angular orientation.

Middle crossrail 16 is longitudinally spaced between frame end assemblies 19 which are positioned at respective ends of side rails 15. Each frame end assembly 19 includes a center portion 20, which may be referred to as crossrail 20, with a leg 21 at each end of center portion 20. The crossrail 20 of the frame end assembly 19 which supports body pad 12 includes a through hole 22 positioned generally centrally therein for receiving a thumb bolt 18 (FIG. 8) for securing body pad 12 with frame 13. The other frame end assembly 19 is positioned to support headrest pad 11 when in a first angular orientation 11A (FIG. 7) relative to body pad 12. Since headrest pad 11 is capable of being positioned in other angular orientations 11B relative to body pad 12, headrest pad 11 is not specifically secured to frame 13.

Legs 21 include an angled portion 23 which extends to a flat portion 24, which may be referred to as offset height portion 24. That is, offset height portion 24 is at a different height than crossrail 20, middle crossrail 16, and side rails 15. The offset height portions 24 include respective through holes 25 for receiving respective caster mounts 26 therein. As shown in the Figures, the angled portion 23 may be at about a 45 degree angle. Other angles will be suitable, including up to a 90 degree right angle.

Caster mounts 26, which in some embodiments may be referred to as a push-in style caster mounting assembly 26 or insert 26, allow a stem 27 of a caster assembly 14 to be inserted from either direction, which may be referred to as either end. In this way, frame 13 can rest on the caster assemblies 14 in a first position of frame 13, and frame 13 can also rest on the caster assemblies 14 in a flipped or reversed position of frame 13.

Figure 11:
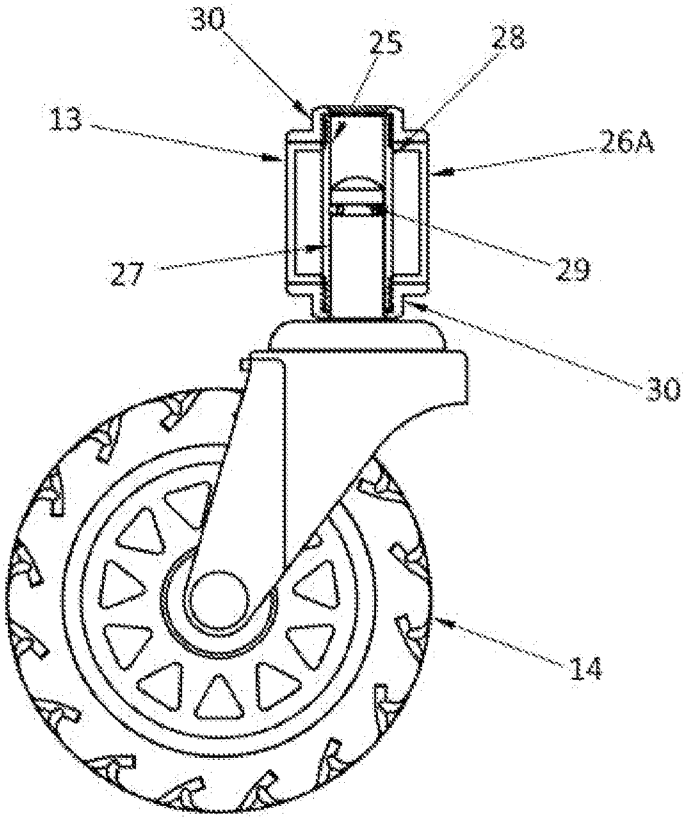
FIG. 11 is a side elevational view of a caster assembly of the caster assemblies of FIG. 2 and a sectional side elevational view of a caster mount into which a stem of the caster assembly is inserted.

A first embodiment of caster mount 26 is shown in FIG. 11 generally indicated by the label 26A. Caster mount 26A includes a barrel 28 which is capable of receiving stem 27 inserted in either end thereof. As shown in FIG. 11, caster stem 27 includes a ring 29 which can be a spring steel grip ring 29 that produces friction and holds the caster stem 27 in place once pressed into the through hole of barrel 28. The inner through hole of barrel 28 should be sized to fit the caster stem 27 tightly for use while still being easy enough to remove by hand.

Barrel 28, which may also be referred to as a partially threaded tube 28, has threaded ends which extend beyond the frame 13. The threaded ends of barrel 28 can then be mated with threading of respective threaded caps 30 at each end. The threaded caps 30 have a surface which abuts the surface of the frame 13 in order to securely position the barrel 28 within the frame 13. The threaded caps 30 can have a tapered opening to assist with inserting stem 27 therein.

Figure 12:
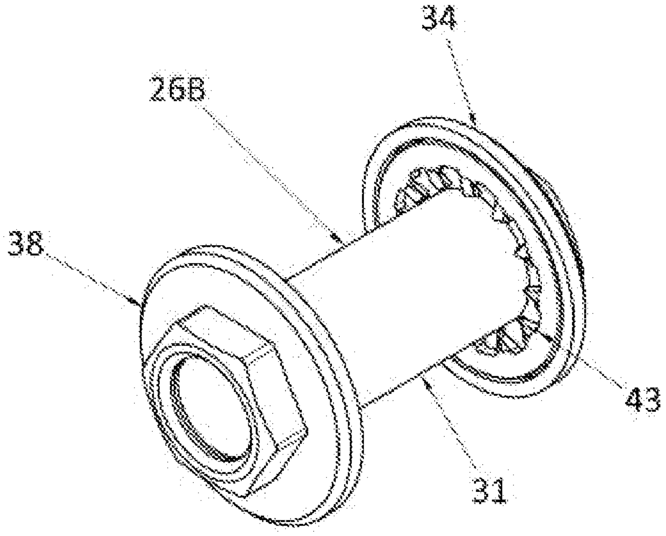
FIG. 12 is a perspective view of an alternative caster mount.
Figure 13:
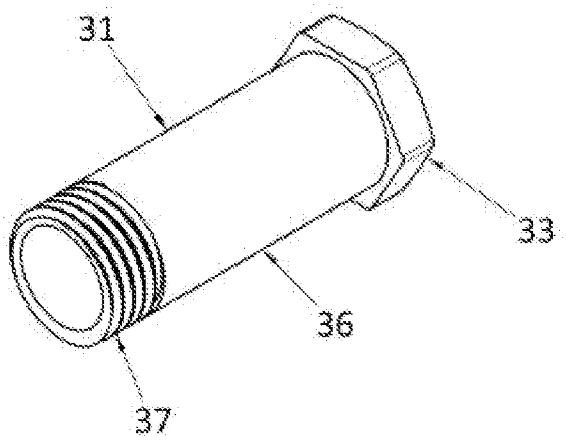
FIG. 13 is a perspective view of a bolt of the caster mount of FIG. 12.
Figure 14:
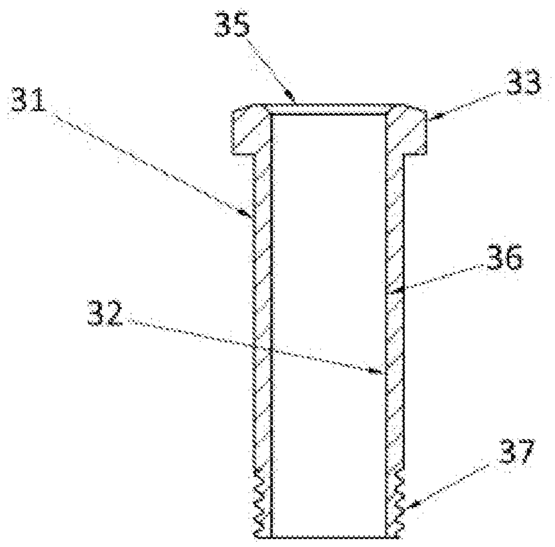
FIG. 14 is a sectional view of the bolt of FIG. 13.
Figure 15:
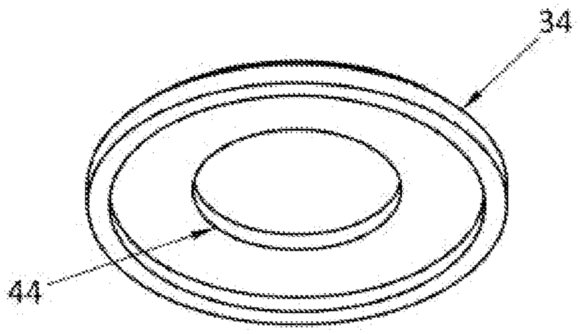
FIG. 15 is a perspective view of a cap of the caster mount of FIG. 12.
Figure 16:
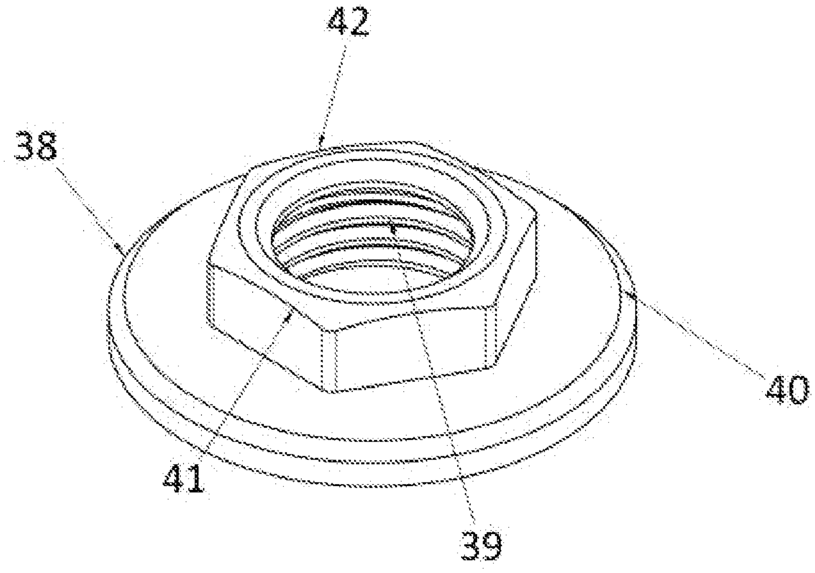
FIG. 16 is a perspective view of a threaded cap of the caster mount of FIG. 12.
Figure 17:
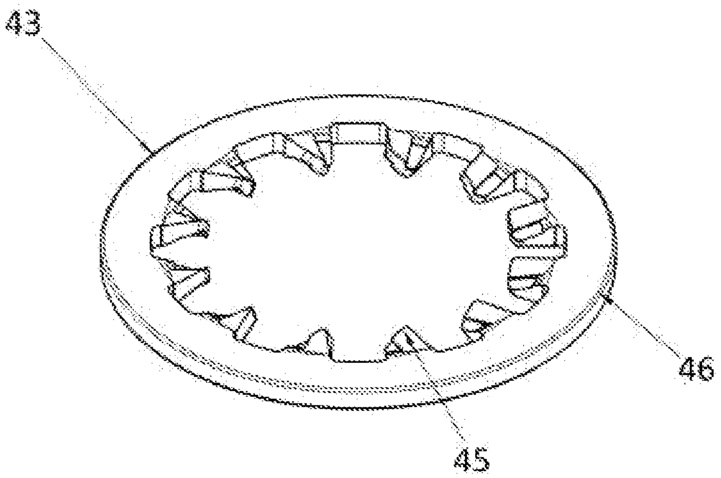
FIG. 17 is a perspective view of a lock washer of the caster mount of FIG. 12.
Figure 18:
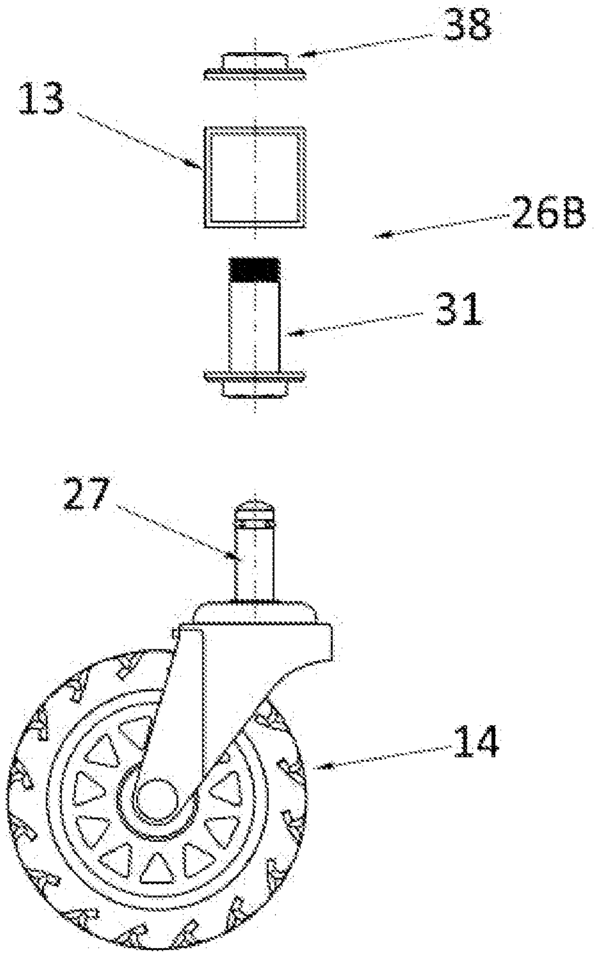
FIG. 18 is a side elevational view of a caster assembly and a side exploded view of the caster mount of FIG. 12.
Figure 19:
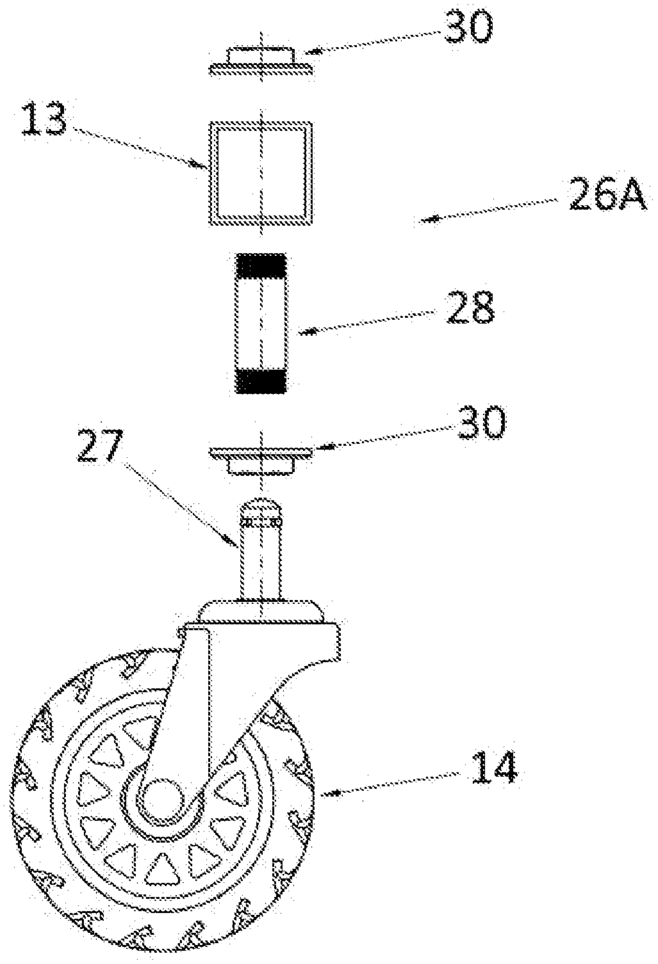
FIG. 19 is a side elevational view of a caster assembly and a side exploded view of the caster mount of FIG. 11.

A second embodiment of caster mount 26 is shown in FIG. 12 generally indicated by the label 26B. Caster mount 26B includes a bolt 31 with an inner through hole 32 which is capable of receiving stem 27 inserted in either end thereof. Ring 29 of caster stem 27 produces friction and holds the caster stem 27 in place once pressed into through hole 32. The inner through hole 32 of bolt 31 should be sized to fit the caster stem 27 tightly for use while still being easy enough to remove by hand.

Bolt 31 includes a head 33 which is positioned over a cap 34 when in use. The cap 34 will abut a surface of the frame 13 for securing caster mount 26B relative to frame 13. Head 33 can have a tapered opening 35 to assist with inserting stem 27 therein.

Bolt 31 further includes an unthreaded portion 36 which generally assists with smoothly inserting bolt 31 into through hole 25 of frame 13. Upon inserting bolt 31 into through hole 25 of frame 13, a threaded portion 37 of bolt 31 will extend beyond the other surface of the frame 13. A threaded cap 38 will then be mated with threaded portion 37 of bolt 31.

Particularly, threading 39 of threaded cap 38 will be mated with threaded portion 37 of bolt 31. Threaded cap 38 includes a cap portion 40 which will abut the other surface of the frame 13 in order to securely position the caster mount 26B within the frame 13 in a tightened position. Threaded cap 38 further includes a hex portion 41 for assistance with tightening threaded cap 38. Hex portion 41 can have a tapered opening 42 to assist with inserting stem 27 therein.

As seen in FIG. 12, a lock washer 43 can be positioned underneath cap 34 and bolt head 33. Specifically, lock washer 43 can be positioned within an opening 44 of cap 34. Lock washer 43 includes teeth 45 spaced about an outer perimeter portion 46. Lock washer 43 generally serves to provide spring tension in order to keep the threaded connection (i.e., threading of threaded portion 37 with threading 39) from vibrating loose.

Figure 20:
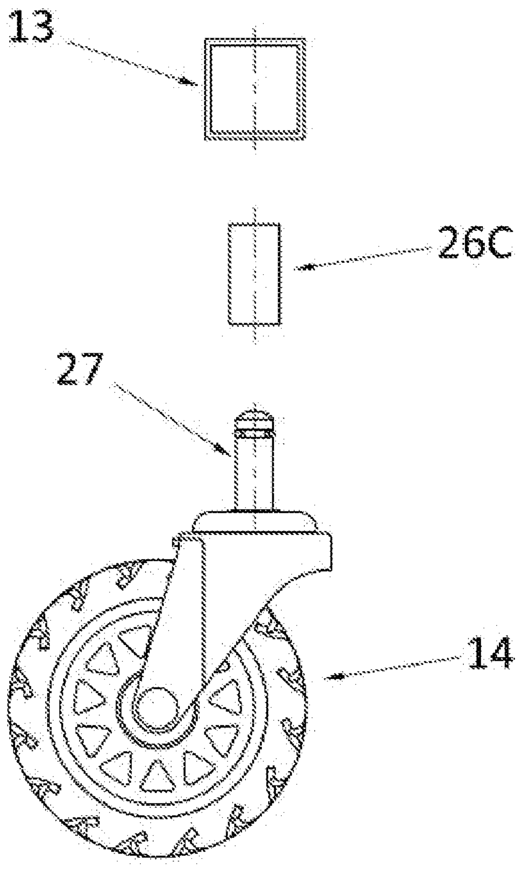
FIG. 20 is a side elevational view of a caster assembly and a side exploded view of a second alternative caster mount.

A third embodiment of caster mount 26 is shown in FIG. 20 generally indicated by the label 26C. Caster mount 26C is an unthreaded tube 26C which can be inserted and welded in place inside the frame 13. Unthreaded tube 26C is capable of receiving and securing stem 27 inserted in either end thereof.

Figure 21:
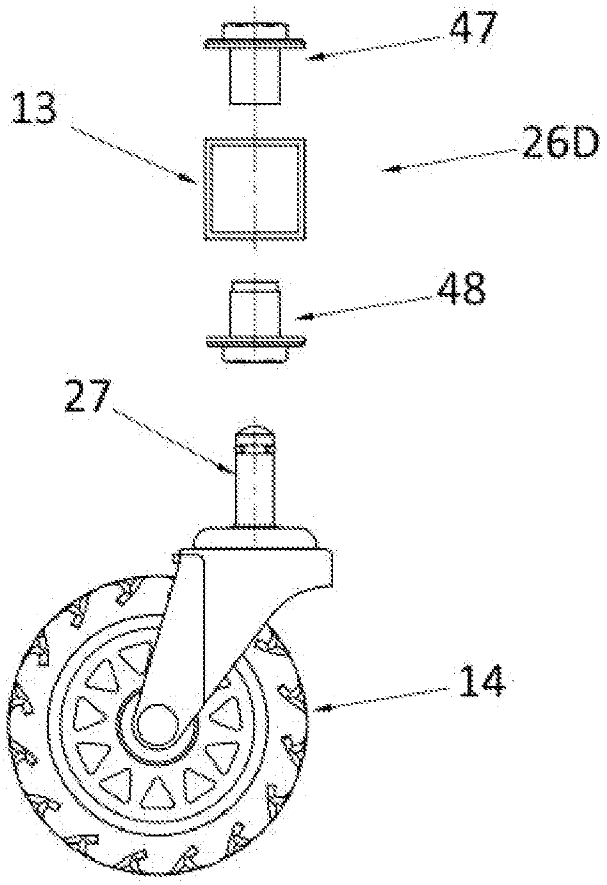
FIG. 21 is a side elevational view of a caster assembly and a side exploded view of a third alternative caster mount.

A fourth embodiment of caster mount 26 is shown in FIG. 21 generally indicated by the label 26D. Caster mount 26D includes a 2-piece insert which is press fit or snapped together, which 2-piece insert includes the through hole. That is, caster mount 26D includes a first piece 47 which is press fit or snapped together with a second piece 48, where the press fit or being snapped together secures caster mount 26D relative to frame 13. As shown in FIG. 21, first piece 47 and second piece 48 can have one or more aspects of other caster mount embodiments disclosed herein. Caster mount 26D is capable of receiving and securing stem 27 inserted in either end thereof.

Figure 22:
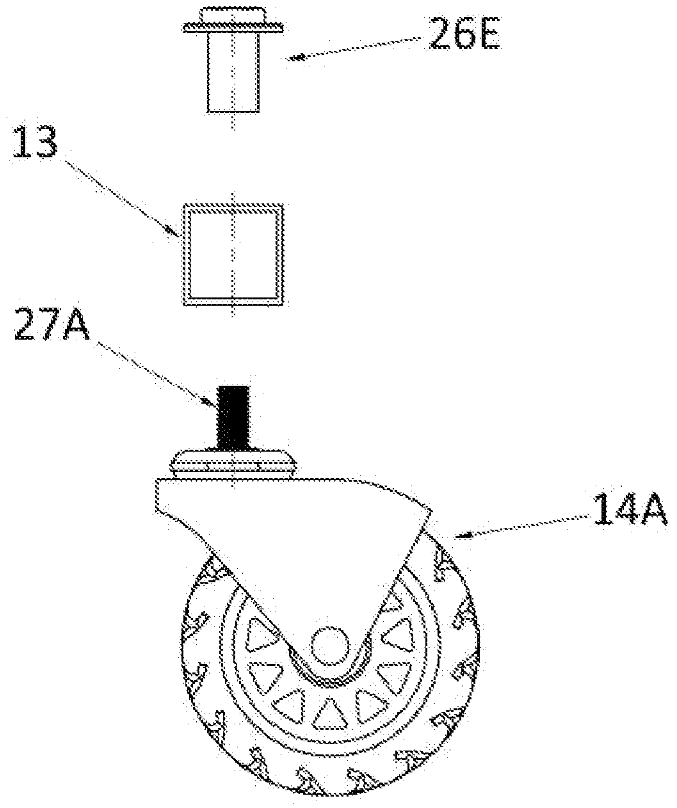
FIG. 22 is a side elevational view of an alternative caster assembly and a side exploded view of a fourth alternative caster mount.

A fifth embodiment of caster mount 26 is shown in FIG. 22 generally indicated by the label 26E in conjunction with a second embodiment of caster assembly 14 generally indicated by the label 14A. Caster mount 26E, which can be referred to as a threaded shaft nut 26E, is shown as a bolt 26E. Caster mount 26E includes internal threading adapted to mate with a threaded stem 27A. That is, caster assembly 14A includes a threaded stem 27A which threading thereof is adapted to mate with internal threading of caster mount 26E. As shown in FIG. 22, caster mount 26E can have one or more aspects of other caster mount embodiments disclosed herein. Caster mount 26E is capable of receiving and securing threaded stem 27A inserted in either end of frame 13. This can include flipping caster mount 26E to the opposing end.

Figure 23:
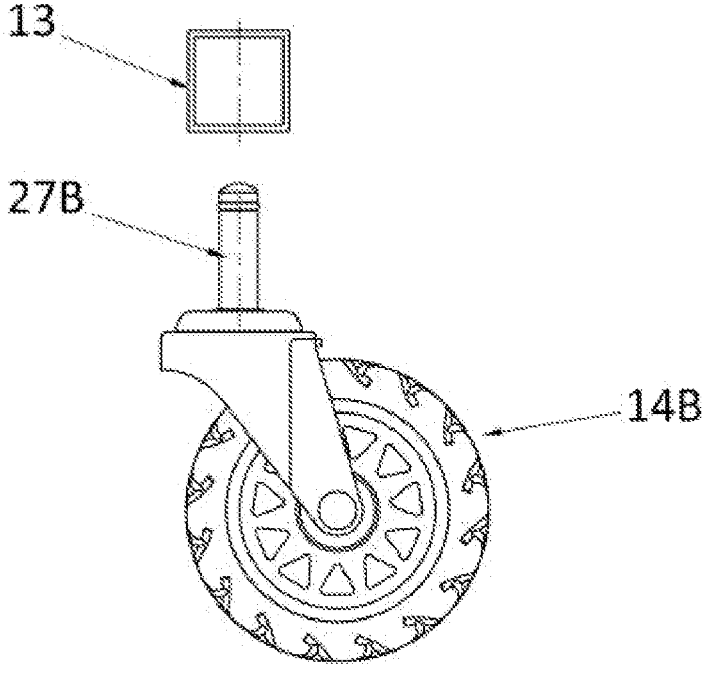
FIG. 23 is a side elevational view of a second alternative caster assembly.

A sixth embodiment of mounting a caster is shown in FIG. 23 in conjunction with a third embodiment of caster assembly 14 generally indicated by the label 14B. Caster assembly 14B includes a longer stem 27B which is capable of inserting directly into frame 13. That is, the embodiment shown in FIG. 23 does not require an insert within frame 13 in order to hold stem 27B in place. Longer stem 27B is capable of being inserted and secured in either end of frame 13.

Figure 8:
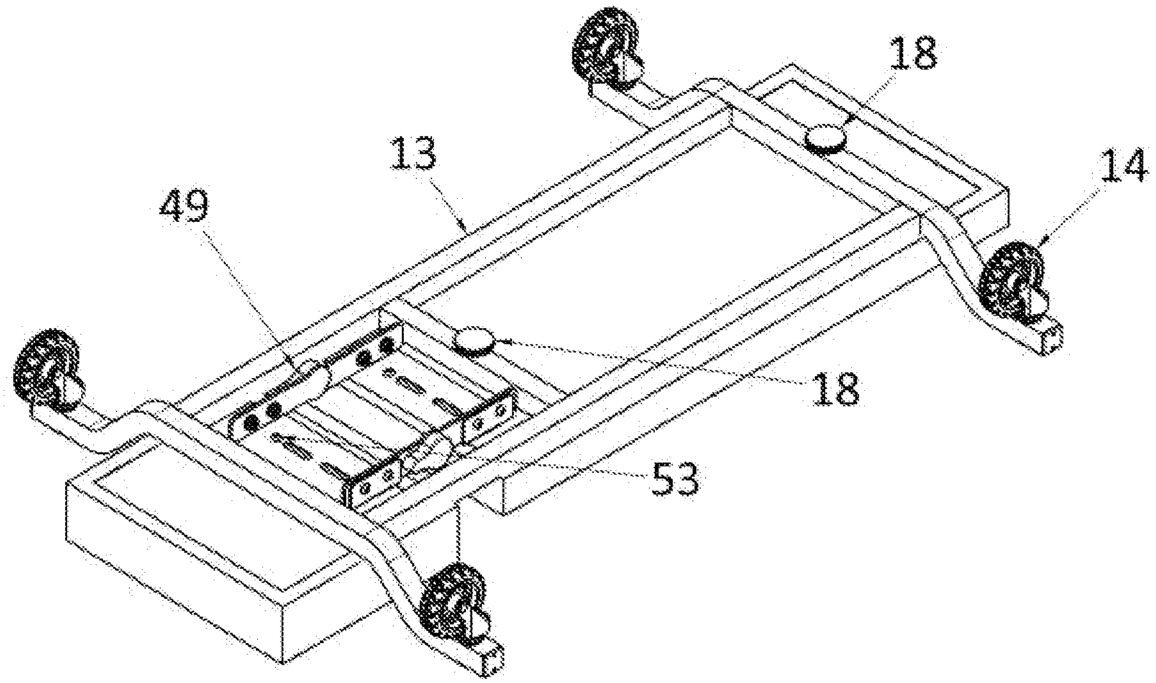
FIG. 8 is a bottom perspective view of the creeper of FIG. 1, showing a hinge assembly for moving the headrest pad between angular orientations.
Figure 9:
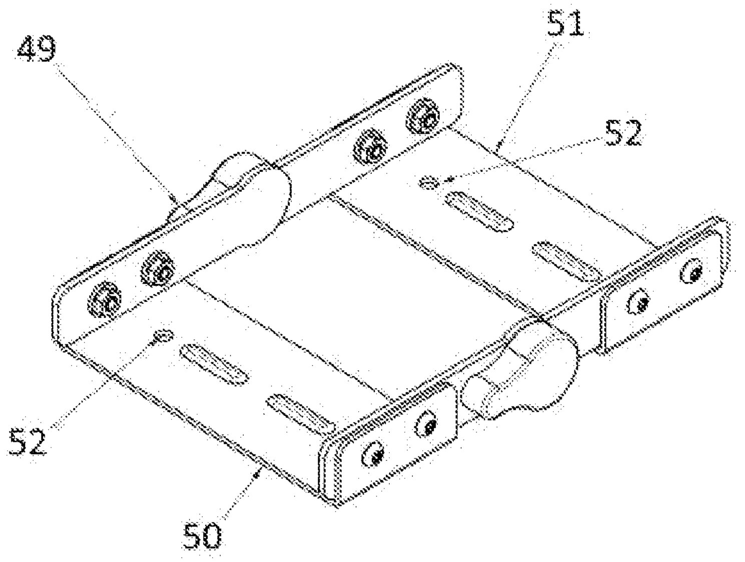
FIG. 9 is a perspective view of the hinge assembly of FIG. 8.

As suggested above relative to the first angular orientation 11A and other angular orientations 11B for headrest pad 11, creeper 10 further includes a hinge assembly 49 for adjusting headrest pad 11 between these angular orientations. Hinge assembly 49 is substantially similar to the hinge assembly disclosed in U.S. Pat. No. 10,232,504, which is therefore incorporated herein by reference for this purpose. Hinge assembly 49 include a first bracket 50 and a second bracket 51 with apertures 52 so that hinge assembly 49 can be attached to pad 11 and pad 12 by fasteners 53, as shown in FIG. 8. One of first bracket 50 and second bracket 51 is attached to pad 11 and the other of first bracket 50 and second bracket 51 is attached to pad 12.

As shown in FIG. 8, hinge assembly 49 is positioned within the space defined by middle crossrail 16, side rails 15, and the crossrail 20 of the frame end assembly 19 which is positioned to support headrest pad 11. In this way, hinge assembly 49 is hidden from normal view when the creeper is in the upright position (i.e., reverse of FIG. 8). This may be referred to as the hinge assembly 49 being inboard and under pad 11 and pad 12. The hinge assembly 49 being under pad 11 and pad 12 refers to a positional aspect. That is, hinge assembly 49 is below pad 11 and pad 12. Said another way, a portion of the hinge assembly 49 is present within a gap between pad 11 and pad 12 though this portion of the hinge assembly 49 present within the gap between pad 11 and pad 12 is positionally below pad 11 and pad 12.

Figure 2:
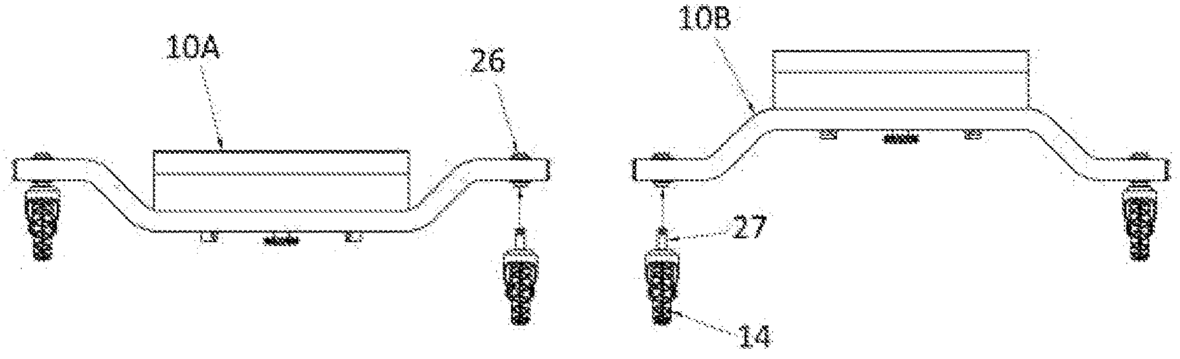
FIG. 2 is a front elevational view of the creeper with the pads in the lowered position and the creeper with the pads in the raised position of FIG. 1, showing caster assemblies as being removable for reversibly positioning a frame into which stems of the caster assemblies are inserted.
Figure 3:
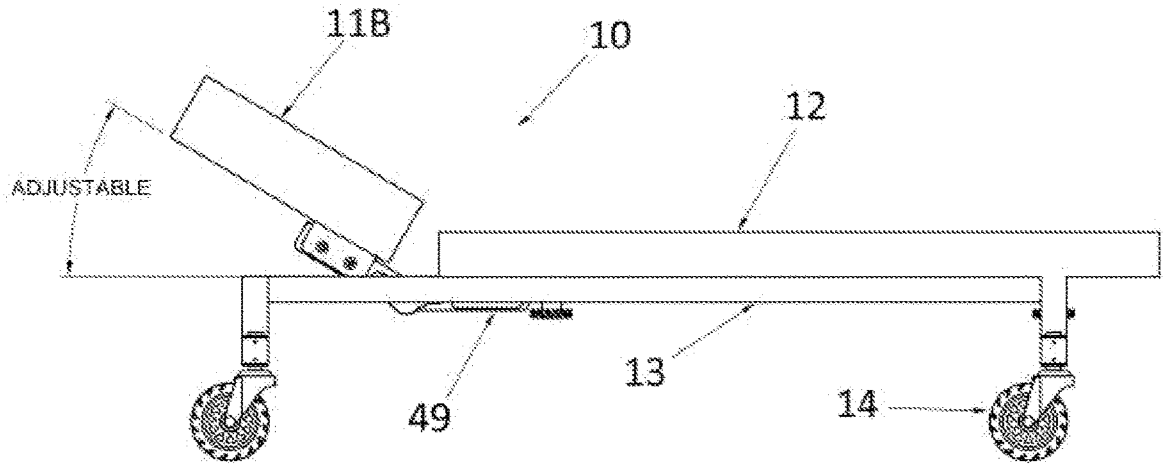
FIG. 3 is a side elevational view of the creeper with the pads in the raised position of FIG. 1, showing a headrest pad in a first angular orientation.
Figure 4:
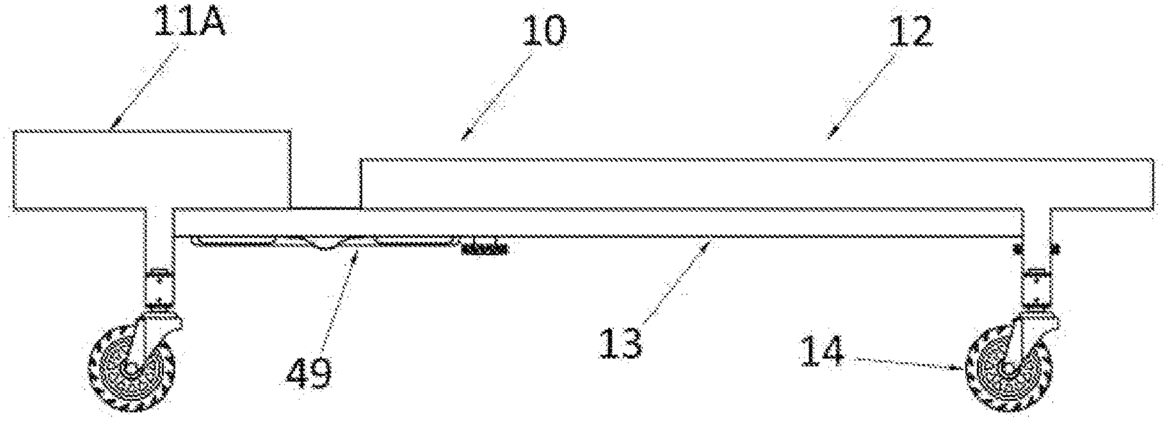
FIG. 4 is a side elevational view of the creeper with the pads in the raised position of FIG. 1, showing the headrest pad in a second angular orientation.
Figure 5:
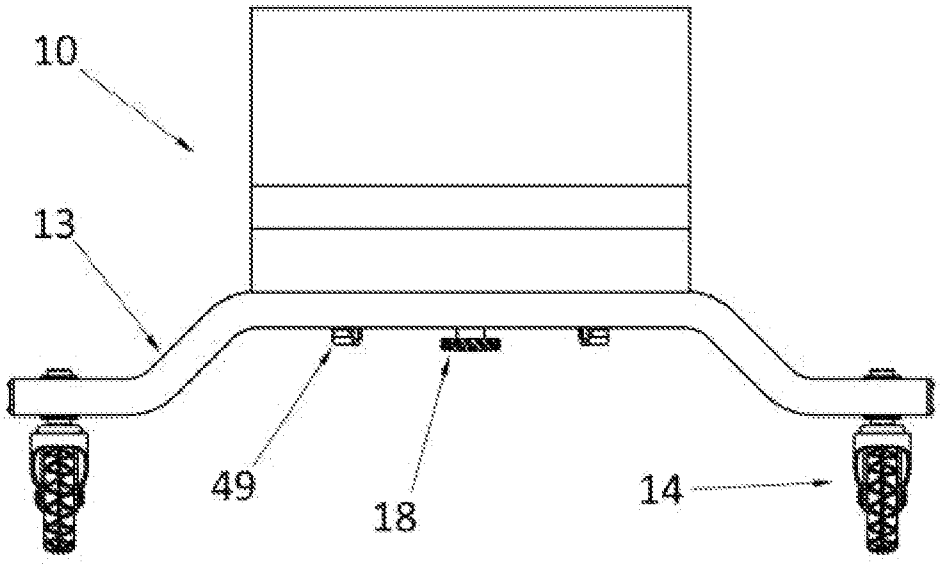
FIG. 5 is a front elevational view of the creeper of FIG. 3 with the headrest pad in the second angular orientation.
Figure 6:
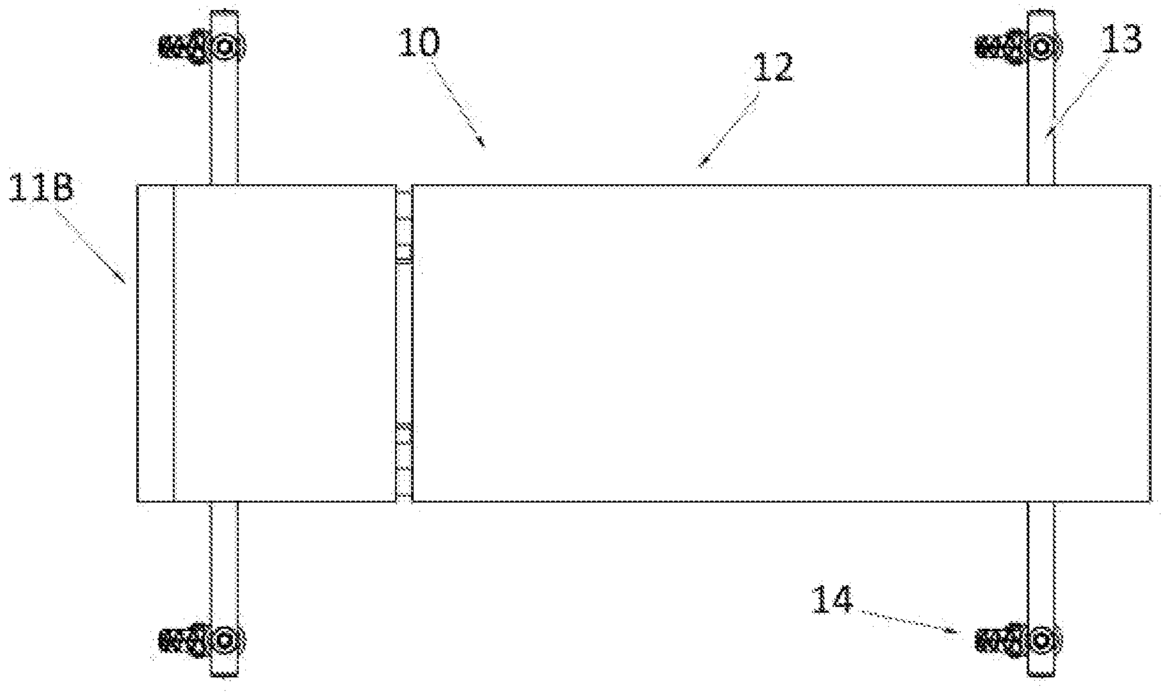
FIG. 6 is a top plan view of the creeper of FIG. 3 with the headrest pad in the second angular orientation.

In view of the above, and as further described relative to a method of adjustment, it should be appreciated that creeper 10 has the ability to provide a raised position for headrest pad 11 and body pad 12 and a lowered position for headrest pad 11 and body pad 12. Reference is further made to FIG. 1 and FIG. 2 which show a first position 10A of creeper 10 and a second position 10B of creeper 10. In the first position 10A, headrest pad 11 and body pad 12 are in a lowered position. In the second position 10B, headrest pad 11 and body pad 12 are in a raised position. This is accomplished by reversing the frame 13.

A method of adjusting creeper 10 is now described, which may be referred to as moving the creeper 10 between the lowered position and raised position. The creeper 10 should first be flipped from an in-use position to a reversed position, which may be referred to as an upside-down position. The headrest pad 11, body pad 12, and caster assemblies 14 should then be removed, which may be referred to as being removed from any attachment to frame 13. Removing the headrest pad 11 and the body pad 12 from any attachment to frame 13 can be accomplished by only removing the thumb bolts 18. The hinge assembly 49 can remain attached with the headrest pad 11 and the body pad 12, and therefore fasteners 53 can remain secured. Removing the caster assemblies 14 will include removing respective stems 27 of the caster assemblies 14 from respective caster mounts 26.

Once headrest pad 11, body pad 12, and caster assemblies 14 are removed from any attachment to frame 13, the frame 13 can then be flipped over. As suggested above, this will include the frame 13 going from a position as shown in the first position 10A of creeper 10 to a position as shown in the second position 10B of creeper 10, or vice versa.

The headrest pad 11, body pad 12 (and hinge assembly 49 attached thereto), and caster assemblies 14 can then be reinstalled in a like manner, but reverse manner, as the removal steps. More specifically, thumb bolts 18 will be reinstalled, and respective stems 27 of the caster assemblies 14 can be inserted in the other ends of respective caster mounts 26. The creeper 10 can then be flipped and returned to the in-use position. Advantageously, the method of adjusting creeper 10 can occur without the need for a user to utilize a tool for acting on a fastener. Both the disassembly and the assembly can occur without the use of a tool. Said another way, the method of adjusting creeper 10 can occur by a user using only their hands for thumb bolts 18.

In light of the foregoing, it should be appreciated that the present invention advances the art by providing an improved creeper. While particular aspects of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A creeper providing a raised position and a lowered position for pads, the creeper comprising:

a frame including side rails at a first height and legs, each leg including a respective flat portion at a different height than the first height of the side rails;

the flat portions of the legs including a respective through hole including two ends;

the through holes each being capable of receiving a respective stem of a respective caster assembly within either of the two ends, each through hole including a respective caster mount positioned therein, the caster mounts including a respective first opening at a respective first end and a respective second opening at a respective second end, the first openings and the second openings being capable of receiving the respective stem of the respective caster assembly within either of the openings;

such that:

in a first position of the frame, the first openings of the caster mounts can receive the respective stems to provide the raised position or the lowered position for the pads, and in a flipped position of the frame, the second openings of the caster mounts can receive the respective stems to provide the other of the raised position and the lowered position for the pads;

wherein the first position of the frame and the flipped position of the frame are both in-use configurations which allow the frame to be supported by the caster assemblies in both the first position of the frame and the flipped position of the frame.

2. The creeper of claim 1, the legs including a respective angled portion extending to the respective flat portion, the frame further including a first crossrail and a second crossrail, and the legs including a first set of legs extending from the first crossrail and a second set of legs extending from the second crossrail.

3. The creeper of claim 1, the caster mounts including a respective barrel including a respective through hole defining the first openings and the second openings, the barrels having externally threaded ends which extend beyond the frame.

4. The creeper of claim 3, the threaded ends of the barrels being mated with threading of respective threaded caps.

5. The creeper of claim 1, the caster mounts including a respective bolt including a respective through hole defining the first openings and the second openings.

6. The creeper of claim 5, the bolts including a threaded portion and an unthreaded portion, the threaded portions extending beyond a surface of the frame and being mated with respective threaded caps.

7. The creeper of claim 1, the caster mounts including a respective unthreaded tube defining the first openings and the second openings.

8. The creeper of claim 1, the caster mounts including a respective first piece which is press fit or snapped together with a respective second piece, where the press fit or being snapped together secures the caster mounts relative to frame, where the first pieces and the second pieces being press fit or snapped together defines the first openings and the second openings.

9. The creeper of claim 1, the stems including threading, the caster mounts including respective internal threading adapted to mate with the threading of the stems.

10. The creeper of claim 1, the pads including a body pad secured to the frame by thumb bolts.

11. The creeper of claim 2, the pads including a headrest pad and a body pad, the creeper further comprising a hinge assembly for adjusting the headrest pad between angular orientations relative to the body pad, where the hinge assembly is positioned entirely below the headrest pad and the body pad.

12. The creeper of claim 11, the hinge assembly including a first bracket attached to the headrest pad and a second bracket attached to the body pad.

13. The creeper of claim 11, where the first crossrail is positioned at respective first ends of the side rails, the frame further including a middle crossrail, the hinge assembly being positioned within a space defined by the middle crossrail, the side rails, and the first crossrail.

14. The creeper of claim 13, where the first crossrail is positioned to support the headrest pad.

15. The creeper of claim 11, where the first crossrail is positioned at respective first ends of the side rails, the frame further including a middle crossrail, the hinge assembly being positioned within a space defined by components consisting of the middle crossrail as a singular middle crossrail, the side rails, and the first crossrail.

* * * * *